(12) United States Patent
Lu et al.

(10) Patent No.: US 8,594,474 B2
(45) Date of Patent: Nov. 26, 2013

(54) MACH-ZEHNDER WAVELENGTH DIVISION MULTIPLEXER HAVING FLAT PASSBAND AND LOW CROSSTALK

(75) Inventors: Hung-Chih Lu, Taoyuan County (TW); Jen-Inn Chyi, Taoyuan County (TW)

(73) Assignee: National Central University, Jhongli (TW)

( * ) Notice: Subject to any disclaimer, the term of this patent is extended or adjusted under 35 U.S.C. 154(b) by 130 days.

(21) Appl. No.: 13/344,657

(22) Filed: Jan. 6, 2012

(65) Prior Publication Data
US 2012/0281949 A1   Nov. 8, 2012

(30) Foreign Application Priority Data

May 5, 2011   (TW) .................................. 100115812

(51) Int. Cl.
 G02B 6/34   (2006.01)
 G02F 1/295   (2006.01)
(52) U.S. Cl.
 USPC ............ 385/37; 385/1; 385/4; 385/15; 385/31
(58) Field of Classification Search
 USPC .................................................... 385/1, 4, 37
 See application file for complete search history.

(56) References Cited

U.S. PATENT DOCUMENTS 8,406,579 B2 * 3/2013 Lu et al. ........................... 385/10
2012/0189249 A1 * 7/2012 Lu et al. ........................... 385/37

* cited by examiner

Primary Examiner — Ryan Lepisto
(74) Attorney, Agent, or Firm — Jackson IPG PLLC

(57) ABSTRACT

A Mach-Zehnder wavelength division multiplexer (WDM) is provided. The WDM has a short length with flat passband and low crosstalk. Since passband is flattened, crosstalk is reduced and length of the WDM is shortened, the WDN can be used for optical communication and optical interconnection in a single chip.

3 Claims, 8 Drawing Sheets

MACH-ZEHNDER WAVELENGTH DIVISION MULTIPLEXER HAVING FLAT PASSBAND AND LOW CROSSTALK

TECHNICAL FIELD OF THE INVENTION

The present invention relates to Mach-Zehnder wavelength division multiplexer (WDM); more particularly, relates to forming the Mach-Zehnder WDM with a Mach-Zehnder interferometer (MZI), at least two side-band eliminator and a winding-type phase-shifting waveguide with passband flattened and crosstalk reduced for optical communication and optical interconnection.

DESCRIPTION OF THE RELATED ART(S)

Although Mach-Zehnder structure is commonly used, it is only used in fiber-fused products. It is because passband of the Mach-Zehnder structure has a Gaussian-like function and is not fit for optical communication. In optical communication, flattened passband and highly-isolated channel are required for application. For flattening the passband and highly isolating the channel, three-stage cascade is needed. However, size of the Mach-Zehnder structure becomes very long that two channels is the optimal to be applied on a chip to make an optical interleaver. Thus, for making a WDM, only fiber-fused products is a possible solution, which greatly limits fields of application of the Mach-Zehnder structure.

In IC-to-IC optical interconnection, transference is happened in a short distance and so requirement on passband is low, where passband flattening and channel highly-isolating are not required and three-stage cascade is not needed either. But, size of the chip is still too big, especially when other optical and electronic devices are integrated with the big WDM. Hence, integration becomes hard with increased complexity and high cost.

For applying WDM in optical communication and optical interconnection, passband has to be flattened, channel has to highly isolated and size has to be reduced. Yet, modern Mach-Zehnder WDM do not have these characteristics, not to mention its high crosstalk. Hence, the Mach-Zehnder WDM is only fit for short-distance optical interconnection between chips.

Hence, the prior arts do not fulfill all users' requests on actual use.

SUMMARY OF THE INVENTION

The main purpose of the present invention is to provide a super short Mach-Zehnder WDM for optical communication and optical interconnection with flattened passband and highly-isolated channel crosstalk.

The second purpose of the present invention is to provide a side-band eliminator as a passband flatter to reduce a 1~2 dB optical power at center bandwidth for flattening a Gaussian-like distribution of the WDM; and as a crosstalk reducer to reduce an optical power more than 20 dB for greatly reduce crosstalk of an adjacent passband.

The second purpose of the present invention is to provide a winding-type phase-shifting waveguide with the phase-shifting waveguide being winded for greatly shortening length of the phase-shifting waveguide and further shortening total length of the WDM.

To sum up, the present invention is a Mach-Zehnder WDM having flat passband and low crosstalk, comprising a Mach-Zehnder interferometer (MZI), a side-band eliminator and a winding-type phase-shifting waveguide, where the MZI comprises a first 3 dB directional coupler, a phase-shifting waveguide and a second 3 dB directional coupler; the side-band eliminator comprises at least one passband flatter and at least one crosstalk reducer; the winding-type phase-shifting waveguide comprises a first macro diameter bending waveguide, a micro diameter bending waveguide and a second macro diameter bending waveguide; the micro diameter bending waveguide has a few cycles; the first 3 dB directional coupler has an input waveguide; the input waveguide has an end connected with a phase-shifting waveguide and is parallel to a part of an end of the winding-type phase-shifting waveguide with a fixed space maintained in between; and the first 3 dB directional coupler receives a light obtained from the input waveguide to average an optical power of the light into two; the phase-shifting waveguide have an end of the different-length phase-shifting waveguide connected with the first 3 dB directional coupler; the phase-shifting waveguide comprises the phase-shifting waveguide and the winding-type phase-shifting waveguide; the winding-type phase-shifting waveguide is longer than the phase-shifting waveguide; the two averaged lights separately pass through the phase-shifting waveguide and the winding-type phase-shifting waveguide; and the phase-shifting waveguide and the winding-type phase-shifting waveguide have different lengths in between to obtain phase difference the second 3 dB directional coupler has an output waveguide; the output waveguide has an end connected with another end of the phase-shifting waveguide; the end of the output waveguide is parallel to a part of another end of the winding-type phase-shifting waveguide with a fixed space maintained; and the second 3 dB directional coupler receives the two averaged lights having the phase difference obtained from the phase-shifting waveguide to make the two averaged lights interfere and be coupled to different outputs to obtain wavelength division multiplexing; each of the side-band eliminator comprises two neighboring waveguides; one of the two neighboring waveguides is cut off at an end; the side-band eliminator is based on a grating-assisted directional coupler; and the side-band eliminator has only one input and only one output formed with a cross-state input waveguide and a corresponding cut-off output waveguide; an end of an input waveguide of the passband flatter is parallel to a part of an output waveguide with a fixed space maintained in between to form a coupling area; a grating structure of the passband flatter is obtained on the coupling area of the input waveguide of the passband flatter and the output waveguide; the grating structure of the passband flatter reflects a wavelength as a center wavelength of a passband; the grating structure of the passband flatter has a length of 1~2 dB optical power reflection to form a notch-type Gaussian-like distribution; and a flat-top passband is obtained through interaction with the Gaussian-like distribution of the passband flatter; an end of the output waveguide of the second 3 dB directional coupler is parallel to a part of an end of an output waveguide of the crosstalk reducer with a fixed space maintained in between to obtain a coupling area; a grating structure of the crosstalk reducer is obtained on the coupling area of the output waveguide of the second 3 dB directional coupler and the output waveguide of the crosstalk reducer; the grating structure reflects a wavelength as a center wavelength of an adjacent passband; the grating structure has a length of more than 20 dB optical power reflection to form a notch-type Gaussian-like distribution; and crosstalk higher than 20 dB is greatly reduced through interaction of the grating structure of the crosstalk reducer with the Gaussian-like distribution of the adjacent passband; the first macro diameter bending waveguide is connected with the input waveguide of the first 3 dB directional coupler; the second macro diameter bending waveguide is connected with the output waveguide of the second 3 dB directional coupler; and the micro diameter bending waveguide is located between the first macro diameter bending waveguide and the second macro diameter bending waveguide. Accordingly, a novel Mach-Zehnder WDM having flat passband and low crosstalk is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

DESCRIPTION OF THE PREFERRED EMBODIMENT

The following description of the preferred embodiment is provided to understand the features and the structures of the present invention.

Figure 1:
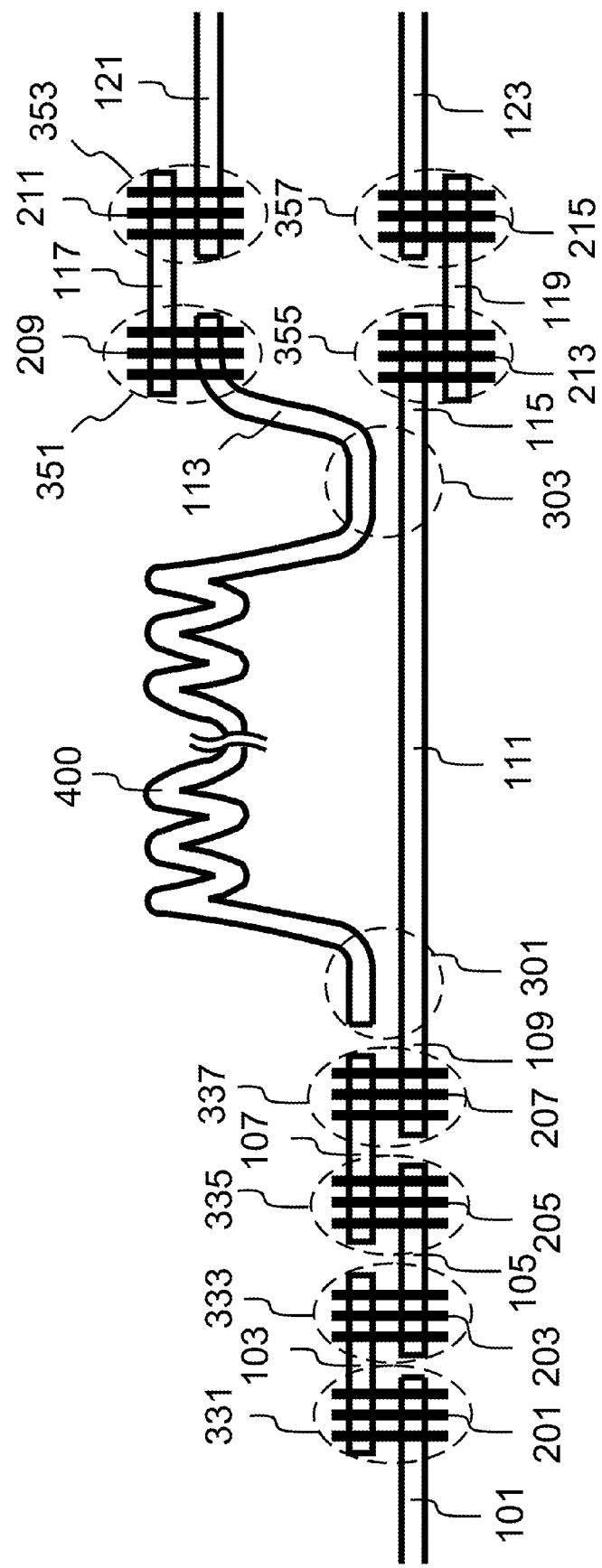

Please refer to FIG. 1, which is a structural view showing a preferred embodiment according to the present invention. As shown in the figure, the present invention is a Mach-Zehnder wavelength division multiplexer (WDM) having flat passband and low crosstalk. The present invention is super small and comprises a Mach-Zehnder interferometer (MZI), at least two unique side-band eliminator and a unique winding-type phase-shifting waveguide 400.

The MZI comprises a first 3 dB directional coupler 301, a phase-shifting waveguide and a second 3 dB directional coupler 303; the first 3 dB directional coupler 301 has a second input waveguide 109; the second input waveguide 109 has an end connected with a phase-shifting waveguide 111 and is parallel to a part of an end of the winding-type phase-shifting waveguide 400 with a fixed space maintained in between; and, the first 3 dB directional coupler 301 receives a light from the second input waveguide 109 to average an optical power of the light into two. The phase-shifting waveguide have an end connected with the first 3 dB directional coupler 301; the phase-shifting waveguide comprises the phase-shifting waveguide 111 and the winding-type phase-shifting waveguide 400; the winding-type phase-shifting waveguide 400 is longer than the phase-shifting waveguide 111; the two averaged lights separately pass through the phase-shifting waveguide 111 and the winding-type phase-shifting waveguide 400; and, the phase-shifting waveguide 111 and the winding-type phase-shifting waveguide 400 have different lengths in between to obtain phase difference. The second 3 dB directional coupler 303 has an output waveguide 115; the output waveguide 115 has an end connected with another end of the phase-shifting waveguide 111; the end of the output waveguide 115 is parallel to a part of another end of the winding-type phase-shifting waveguide 400 with a fixed space maintained; and, the second 3 dB directional coupler receives the two averaged lights having the phase difference from the phase-shifting waveguide to make the two averaged lights interfere and be coupled to different outputs for wavelength division multiplexing The side-band eliminator is uniquely invented in the present invention, which is based on a grating-assisted directional coupler except one of two neighboring waveguides is cut off at an end for forming only one input and only one output.

The side-band eliminator comprises at least one passband flatter and at least one crosstalk reducer. Number of the passband flatters and the crosstalk reducers is related to number of channels. Take four WDMs as an example. Four passband flatters are required, which are a first passband flatter 331, a second passband flatter 333, a third passband flatter 335 and a fourth passband flatter 337; and, four crosstalk reducers are required, which are a first crosstalk reducer 351, a second crosstalk reducer 353, a third crosstalk reducer 355 and a fourth crosstalk reducer 357. Grating structures are used in the passband flatters and the crosstalk reducers and are general gratings. Take four channels having wavelengths of $\lambda_1$, $\lambda_2$, $\lambda_3$ and $\lambda_4$ as an example. The grating structures of the passband flatters are separately designed at 1~2 dB optical power reflection of the wavelengths of $\lambda_1$, $\lambda_2$, $\lambda_3$ and $\lambda_4$.

In the first passband flatter 331, an end of a first input waveguide 101 is parallel to a part of a first connecting waveguide 103 with a fixed space maintained in between to form a coupling area; a first grating structure 201 is set on the coupling area of the first input waveguide 101 and the first connecting waveguide 103; and, the first grating structure 201 reflects a wavelength as a center wavelength of a passband, like $\lambda_1$, where a length of the first grating structure 201 is of 1~2 dB optical power reflection to form a notch-type Gaussian-like distribution. Thus, a flat-top passband is obtained through interaction with the Gaussian-like distribution.

In the second passband flatter 333, another end of the first connecting waveguide 103 is parallel to a part of an end of a second connecting waveguide 105 with a fixed space maintained in between to form a coupling area; a second grating structure 203 is set on the coupling area of the first connecting waveguide 103 and the second connecting waveguide 105; and, the second grating structure 203 reflects a wavelength as a center wavelength of another passband, like $\lambda_2$, where a length of the second grating structure 203 is of 1~2 dB optical power reflection to form a notch-type Gaussian-like distribution. Thus, a flat-top passband is obtained through interaction with the Gaussian-like distribution.

In the third passband flatter 335, another end of the second connecting waveguide 105 is parallel to a part of an end of a third connecting waveguide 107 with a fixed space maintained in between to form a coupling area; a third grating structure 205 is set on the coupling area of the second connecting waveguide 105 and the third connecting waveguide 107; and, the third grating structure 205 reflects a wavelength as a center wavelength of another passband, like $\lambda_3$, where a length of the third grating structure 205 is of 1~2 dB optical power reflection to form a notch-type Gaussian-like distribution. Thus, a flat-top passband is obtained through interaction with the Gaussian-like distribution.

In the fourth passband flatter 337, another end of the third connecting waveguide 107 is parallel to a part of an end of the second input waveguide 109 of the first 3 dB directional coupler 301 with a fixed space maintained in between to form a coupling area; a fourth grating structure 207 is set on the coupling area of the third connecting waveguide 107 and the second input waveguide 109; the fourth grating structure 207 reflects a wavelength as a center wavelength of another passband, like $\lambda_4$, where a length of the fourth grating structure 207 is of 1~2 dB optical power reflection to form a notch-type Gaussian-like distribution. Thus, a flat-top passband is obtained through interaction with the Gaussian-like distribution.

In the first crosstalk reducer 351, an end of a first output waveguide 113 of the second 3 dB directional coupler 303 is parallel to a part of an end of a fourth connecting waveguide 117 with a fixed space maintained in between to obtain a coupling area; the first output waveguide 113 transfers the $\lambda_2$ wavelength and the $\lambda_4$ wavelength; a fifth grating structure 209 is set on the coupling area of the first output waveguide 113 and the fourth connecting waveguide 117; and, the fifth grating structure 209 reflects a wavelength as a center wavelength of an adjacent passband, like $\lambda_1$, where the fifth grating structure 209 has a length of more than 20 dB optical power reflection to form a notch-type Gaussian-like distribution. Thus, crosstalk higher than 20 dB is greatly reduced through interaction with the crosstalk formed by the Gaussian-like distribution of the adjacent passband.

In the second crosstalk reducer 353, another end of the fourth connecting waveguide 117 is parallel to a part of an end of a third output waveguide 121 with a fixed space maintained in between to obtain a coupling area; a sixth grating structure 211 is set on the coupling area of the fourth connecting waveguide 117 and the third output waveguide 121; and, the sixth grating structure 211 reflects a wavelength as a center wavelength of an adjacent passband, like $\lambda_3$, where the sixth grating structure 211 has a length of more than 20 dB optical power reflection to form a notch-type Gaussian-like distribution. Thus, crosstalk higher than 20 dB is greatly reduced through interaction with the crosstalk formed by the Gaussian-like distribution of the adjacent passband.

In the third crosstalk reducer 355, an end of the second output waveguide 115 of the second 3 dB directional coupler 303 is parallel to a part of an end of a fifth connecting waveguide 119 with a fixed space maintained in between to obtain a coupling area; the second output waveguide 115 transfers the $\lambda_1$ wavelength and the $\lambda_3$ wavelength; a seventh grating structure 213 is set on the coupling area of the second output waveguide 115 and the fifth connecting waveguide 119; and, the seventh grating structure 213 reflects a wavelength as a center wavelength of an adjacent passband, like $\lambda_2$, where the seventh grating structure 213 has a length of more than 20 dB optical power reflection to form a notch-type Gaussian-like distribution. Thus, crosstalk higher than 20 dB is greatly reduced through interaction with the crosstalk formed by the Gaussian-like distribution of the adjacent passband.

In the fourth crosstalk reducer 357, another end of the fifth connecting waveguide 119 is parallel to a part of an end of a fourth output waveguide 123 with a fixed space maintained in between to obtain a coupling area; an eighth grating structure 215 is set on the coupling area of the fifth connecting waveguide 119 and the fourth output waveguide 123; and, the eighth grating structure 215 reflects a wavelength as a center wavelength of an adjacent passband, like $\lambda_4$, where the eighth grating structure 215 has a length of more than 20 dB optical power reflection to form a notch-type Gaussian-like distribution. Thus, crosstalk higher than 20 dB is greatly reduced through interaction with the crosstalk formed by the Gaussian-like distribution of the adjacent passband.

Take 4 channels of wavelength division multiplexing as an example. Optical signals of wavelengths $\lambda_1$, $\lambda_2$, $\lambda_3$ and $\lambda_4$ are inputted from the first input waveguide 101. Through the first passband flatter 331, the wavelength $\lambda_1$ is reduced for 1~2 dB power beforehand to form a notch-type Gaussian-like distribution. Then, the light is coupled to the first connecting waveguide 103 to be passed through the second passband flatter 333 for reducing 1~2 dB power of the wavelength $\lambda_2$ to form a notch-type Gaussian-like distribution. Then, the light is coupled to the second connecting waveguide 105 to be passed through the third passband flatter 335 for reducing 1~2 dB power of the wavelength $\lambda_3$ to form a notch-type Gaussian-like distribution. Then, the light is coupled to the third connecting waveguide 107 to be passed through the fourth passband flatter 337 for reducing 1~2 dB power of the wavelength $\lambda_4$ to form a notch-type Gaussian-like distribution. At last, the light is coupled to the second input waveguide 109 to be connected to the first 3 dB directional coupler 301 of the MZI.

Optical signals of the wavelengths $\lambda_1$, $\lambda_2$, $\lambda_3$ and $\lambda_4$ are inputted from the second input waveguide 109. After passing through the first 3 dB directional coupler 301, the light is separately transferred to the phase-shifting waveguide 111 and the winding-type phase-shifting waveguide 400. Optical signals having different wavelengths obtains phase difference because the length of the winding-type phase-shifting waveguide 400 is longer than that of the phase-shifting waveguide 111. After passing through the second 3 dB directional coupler 303, owing to different interferences and coupling, the final optical signals of $\lambda_1$ and $\lambda_3$ are outputted to the second output waveguide 115; and the final optical signals of $\lambda_2$ and $\lambda_4$ are outputted to the first output waveguide 113. The light having various wavelengths is processed through wavelength division multiplexing. Because the MZI has a Gaussian-function spectrum, a 1~2 dB optical power is reduced in advance through the first passband flatter 331, the second passband flatter 333, the third passband flatter 335 and the fourth passband flatter 377 to form notch-type Gaussian-like distributions for interactions. Finally, the four passbands become flat-top passbands.

After obtaining the flat-top passbands and processing wavelength division multiplexing to the optical signals, the optical signals of $\lambda_2$ and $\lambda_4$ are coupled to the first output waveguide 113 to be passed through the first crosstalk reducer 351 for reducing more than 20 dB of crosstalk formed by $\lambda_1$ to be coupled to the fourth connecting waveguide 117. The optical signals of $\lambda_2$ and $\lambda_4$ are passed through the second crosstalk reducer 353 for reducing more than 20 dB of crosstalk formed by $\lambda_3$ to be coupled to the third output waveguide 121. Thus, the optical signals of $\lambda_2$ and $\lambda_4$ transferred by the third output waveguide 121 have high-channel isolation owing to the great reduction of the crosstalk formed by $\lambda_1$ and $\lambda_3$.

After obtaining the flat-top passbands and processing wavelength division multiplexing to the optical signals, the optical signals of $\lambda_1$ and $\lambda_3$ are coupled to the second output waveguide 115 to be passed through the third crosstalk reducer 355 for reducing more than 20 dB of crosstalk formed by $\lambda_2$ to be coupled to the fifth connecting waveguide 119. The optical signals of $\lambda_1$ and $\lambda_3$ are passed through the fourth crosstalk reducer 357 for reducing more than 20 dB of crosstalk formed by $\lambda_4$ to be coupled to the fourth output waveguide 123. Thus, the optical signals of $\lambda_1$ and $\lambda_3$ transferred by the fourth output waveguide 123 have high-channel isolation owing to the great reduction of the crosstalk formed by $\lambda_2$ and $\lambda_4$.

The present invention focuses on Mach-Zehnder structure with three refinements. The first refinement is related to passband flatter for flattening passband; the second refinement is related to crosstalk reducer for greatly reducing crosstalk of passband; and, the third refinement is related to a unique winding-type phase-shifting waveguide for greatly reducing length. These three refinements are separately independent that all three can be used, or two of them are used or each one can be used alone. For various requirements, multiple choices of refinements are available.

Figure 2:
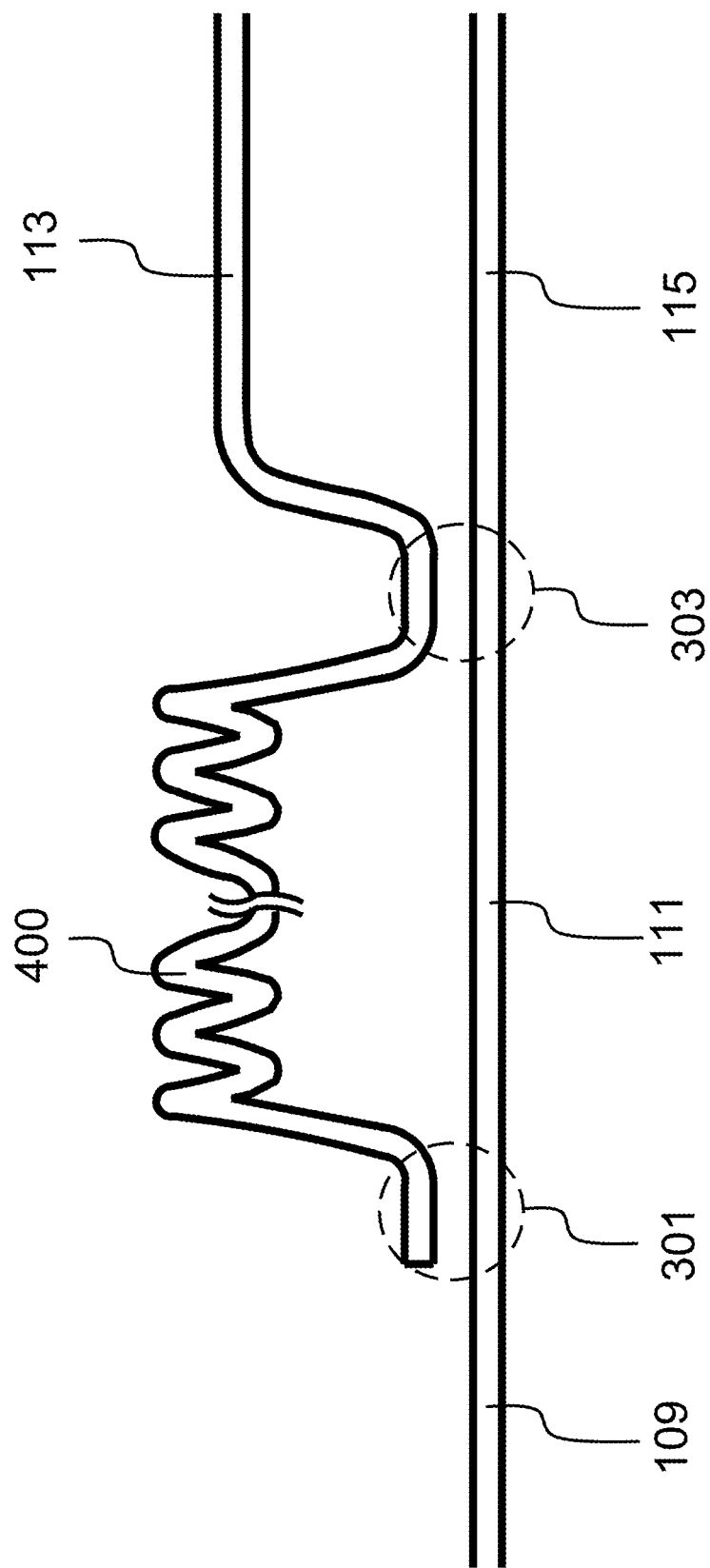
FIG. 2 is the structural view showing the MZI of the winding-type phase-shifting waveguide.

Please refer to FIG. 2, which is a structural view showing an MZI of a winding-type phase-shifting waveguide. As shown in the figure, an MZI of a winding-type phase-shifting waveguide is used, which is a small-size MZI. A light having various wavelengths is inputted from a second input waveguide 109 to be passed through a first 3 dB directional coupler 301 to be divided into two and be separately transferred to a phase-shifting waveguide 111 and a winding-type phase-shifting waveguide 400. Because length of the winding-type phase-shifting waveguide 400 is longer than that of the phase-shifting waveguide 111, optical signals having various wavelengths generate phase difference. After passing through the second 3 dB directional coupler 303, different interferences and coupling are formed and the light having different wavelengths is coupled to a first output waveguide 113 and a second output waveguide 115. Thus, wavelength division multiplexing is processed to the light having different wavelengths.

Figure 3:
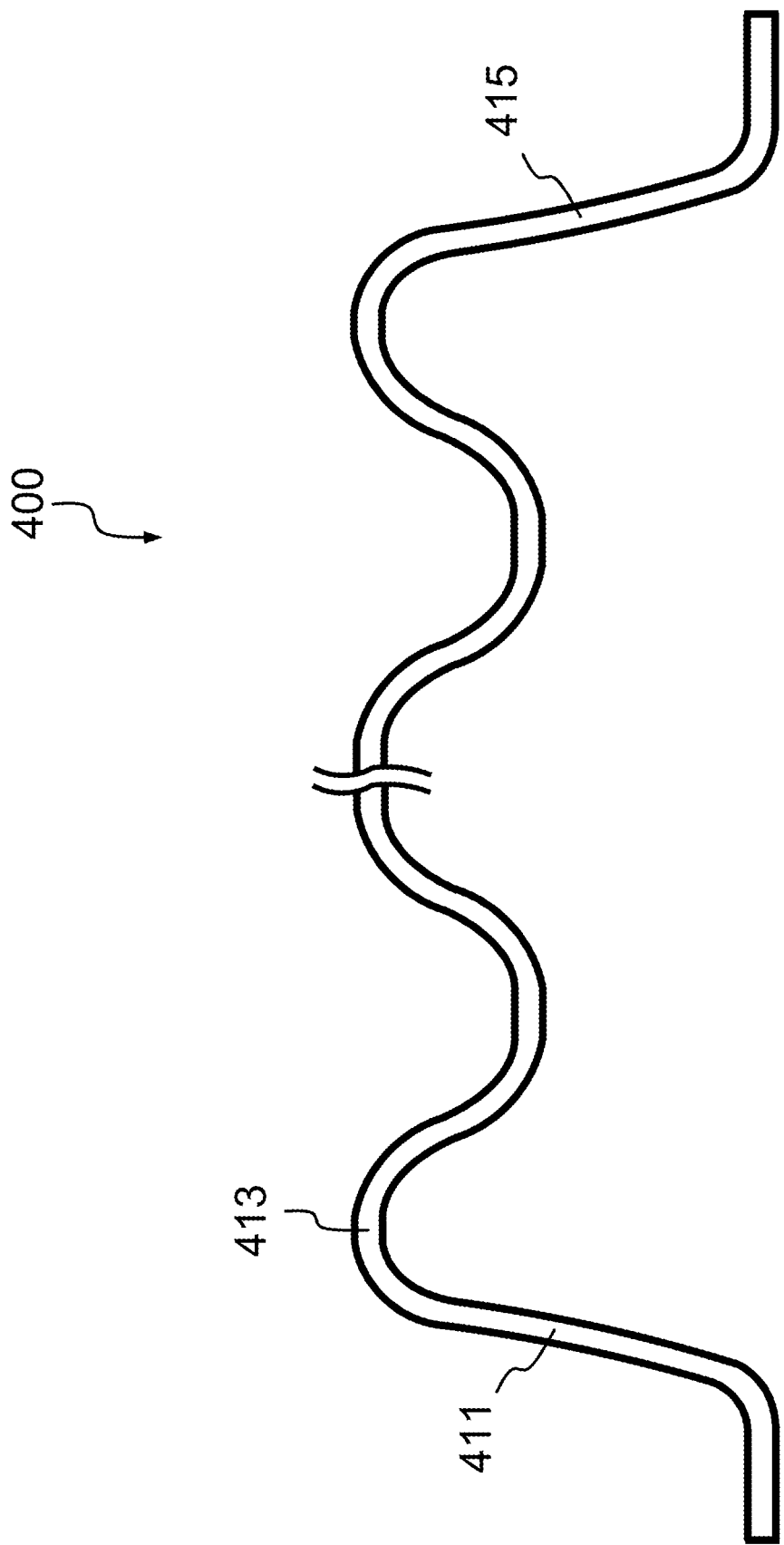
FIG. 3 is the structural view showing the winding-type phase-shifting waveguide.

Please refer to FIG. 3, which is a structural view showing a winding-type phase-shifting waveguide. As shown in the figure, a winding-type phase-shifting waveguide is made of bending waveguides having various diameters, comprising a first macro diameter bending waveguide 411, a micro diameter bending waveguide 413 and a second macro diameter bending waveguide 415. Therein, the first macro diameter bending waveguide 411 is connected with an input waveguide of a first 3 dB directional coupler; the second macro diameter bending waveguide 415 is connected with an output waveguide of a second 3 dB directional coupler; and, the micro diameter bending waveguide 413 is located between the first and the second macro diameter bending waveguides 411,415. The micro diameter bending waveguide 413 has a few curve cycles; and, the more cycles, the smaller size yet with bigger optical loss.

Figure 4:
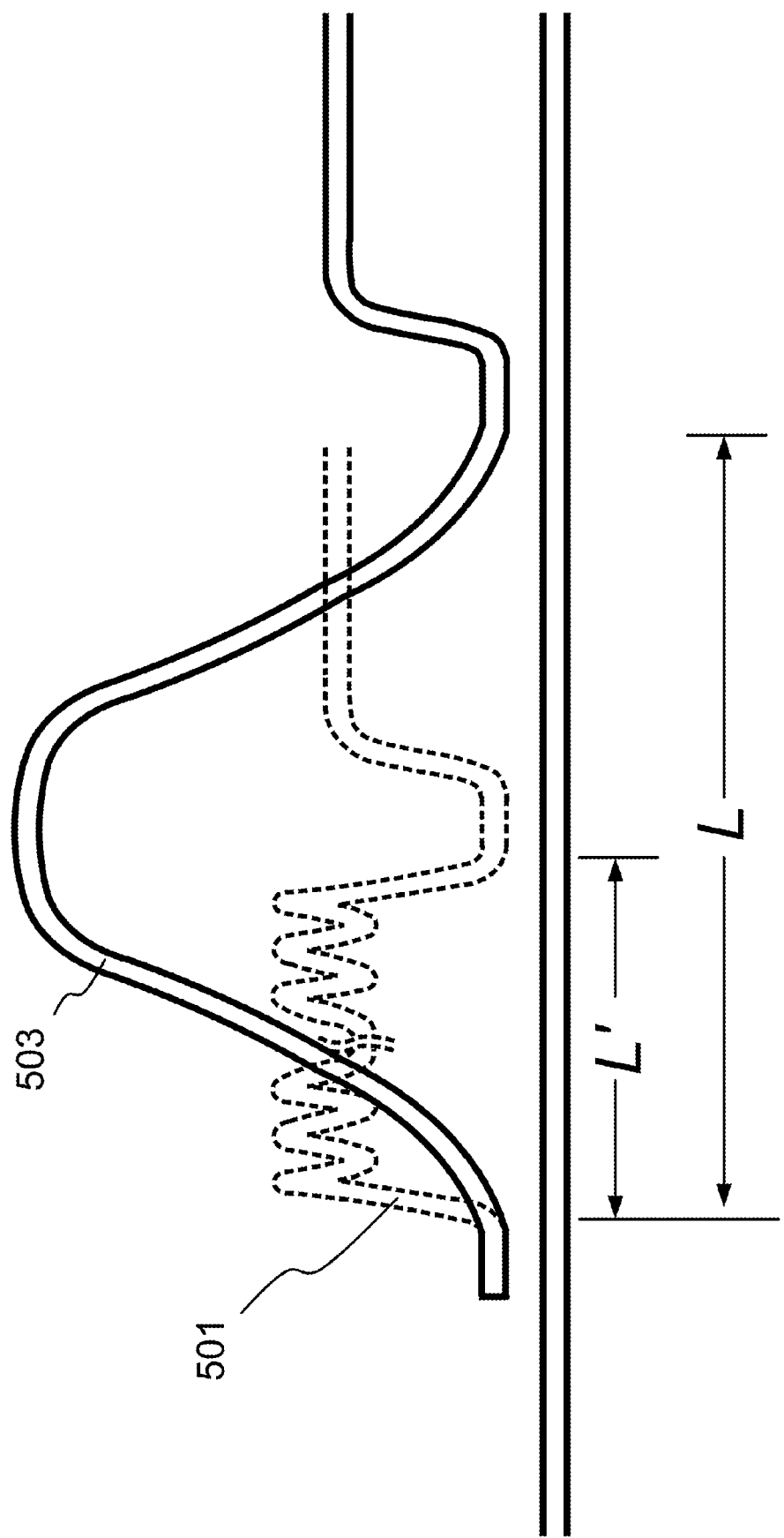
FIG. 4 is the view showing the comparison on length of the MZI.

Please refer to FIG. 4, which is a view showing comparison on length of MZI. As shown in the figure, a Mach-Zehnder WDM 501 is greatly reduced in size due to a winding-type phase-shifting waveguide. Thus, the Mach-Zehnder WDM 501 used in the present invention has a total length L' much shorter than a length L of a general Mach-Zehnder WDM 503.

Figure 5:
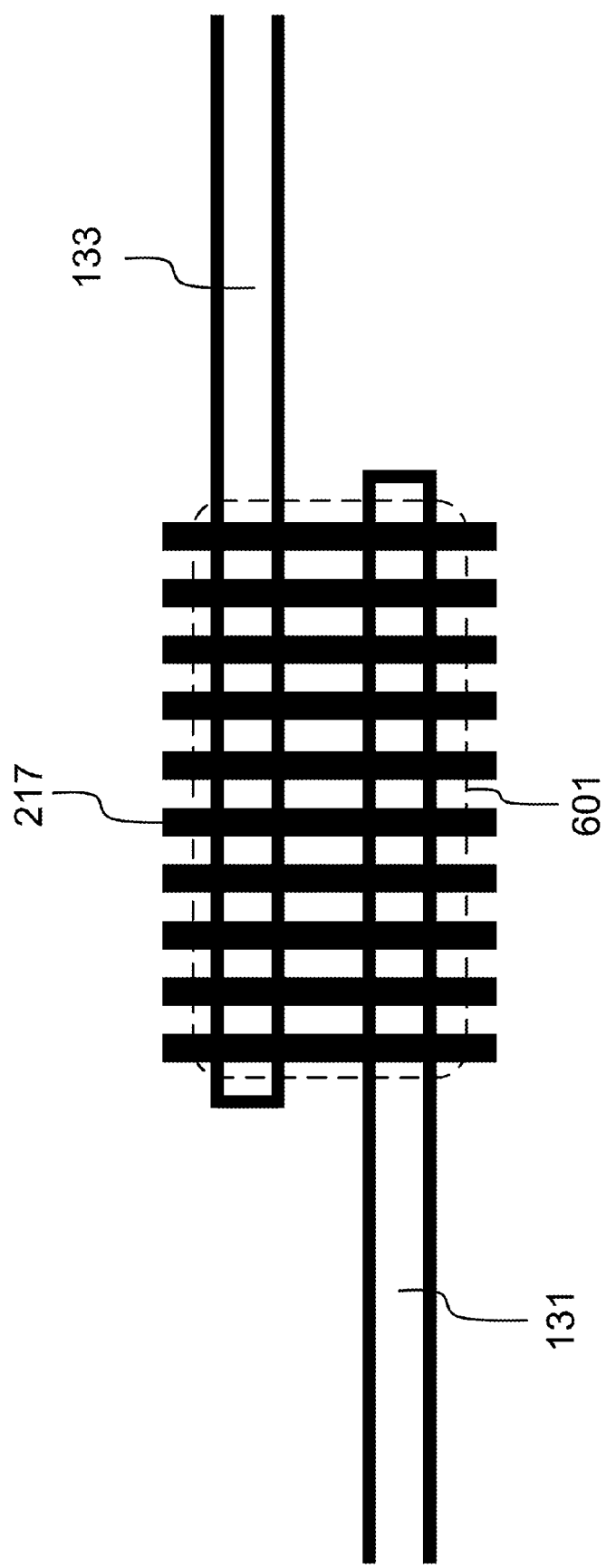
FIG. 5 is the structural view showing the side-band eliminator.

Please refer to FIG. 5, which is a structural view showing a side-band eliminator. As shown in the figure, optical signals are inputted from a third input waveguide to enter a cross-state directional coupler 601 to be coupled to a fifth output waveguide 133. A ninth grating structure 217 is set on the cross-state directional coupler 601 for coupling the light to a cut-off end of the fifth output waveguide 133 to be scattered, where the light has the wavelength reflected by the ninth grating structure 217. Passband flatters and crosstalk reducers used in the present invention all have this kind of structure. What differs is on that the light reflected by the grating structure of the passband flatter is a center wavelength of the passband having a reflective power about 1~2 dB; and the light reflected by the grating structure of the crosstalk reducer is a center wavelength of an adjacent passband existed in a channel having a reflective power more than 20 dB.

Figure 6:
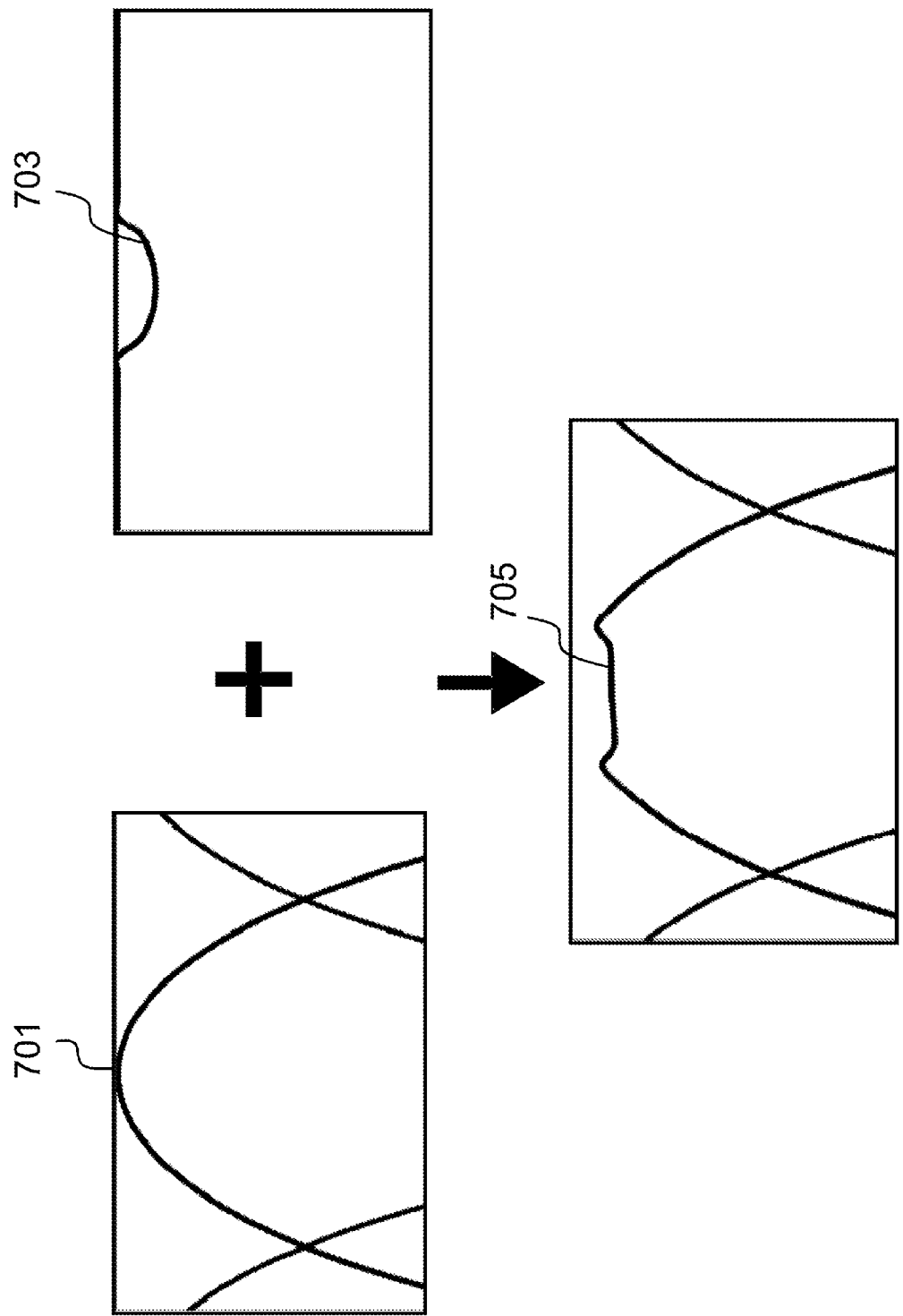
FIG. 6 is the view showing the spectrum of the passband flatter.

Please refer to FIG. 6, which is a view showing a spectrum of a passband flatter. As shown in the figure, a passband 701 of an MZI has a Gaussian-like distribution; a passband 703 of a passband flatter has a notch-type Gaussian-like distribution; and, through interaction in between, a passband 705 of the MZI using the passband flatter has a flat-top distribution.

Figure 7:
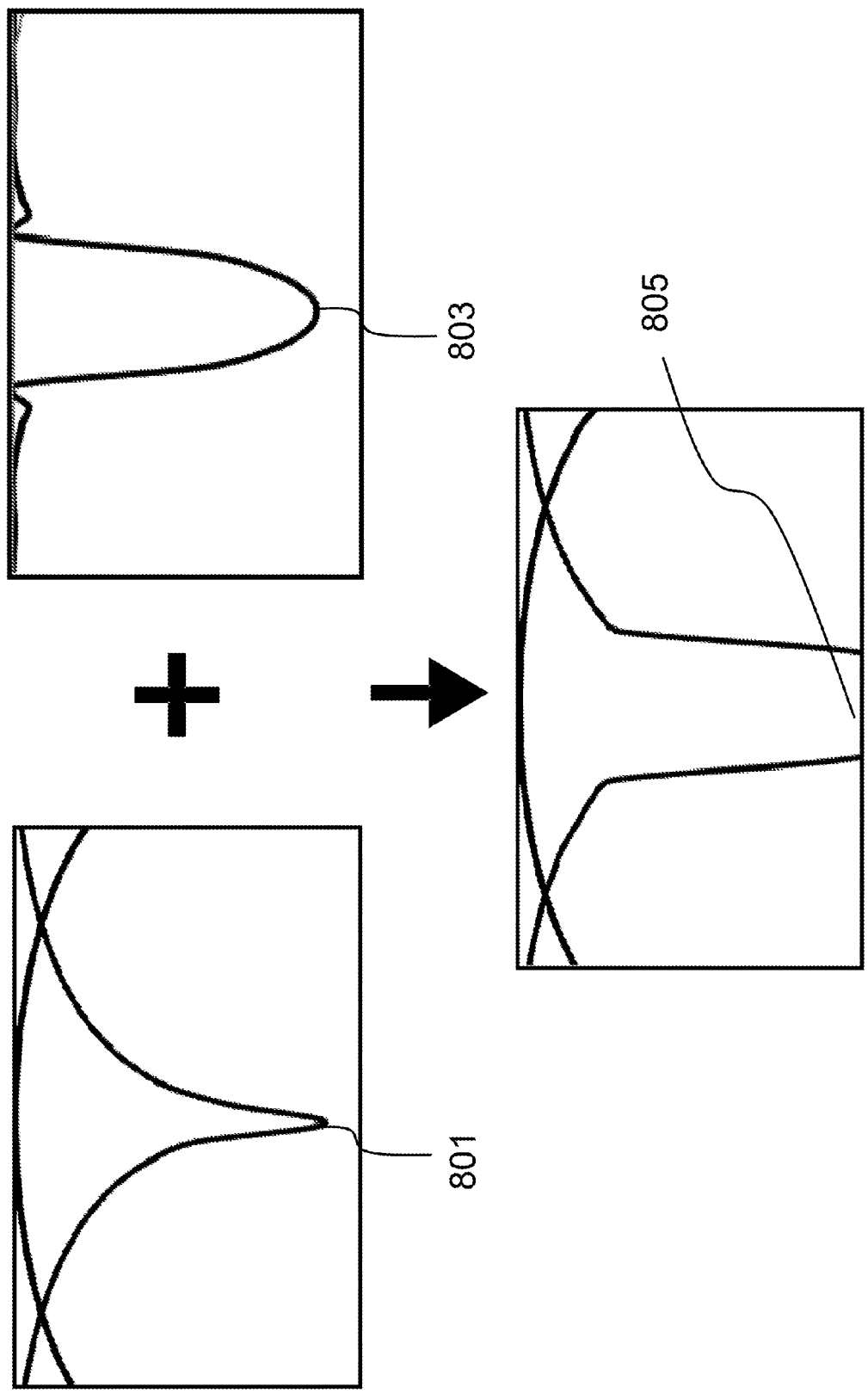
FIG. 7 is the view showing the spectrum of the crosstalk reducer.

Please refer to FIG. 7, which is a view showing a spectrum of a crosstalk reducer. As shown in the figure, a passband 801 of an MZI has a Gaussian-like distribution; and, thus, adjacent wavelength affects a channel with great crosstalk. A passband 803 of a crosstalk reducer has a notch-type Gaussian-like distribution. Through interaction between the MZI and the crosstalk reducer, a passband 805 of the MZI using the crosstalk reducer is greatly reduced in crosstalk.

Figure 8:
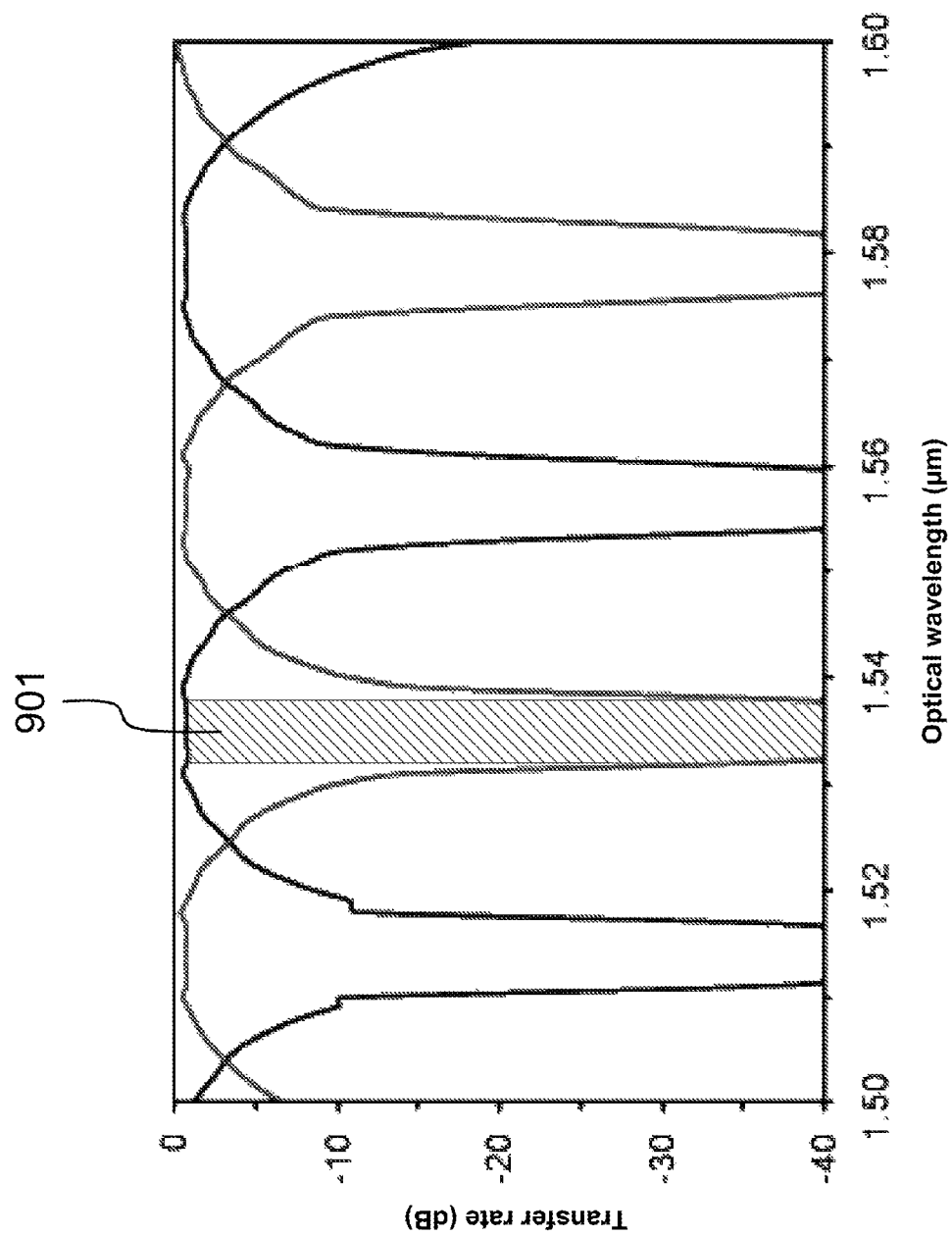
FIG. 8 is the view showing the spectrum of the present invention.

Please refer to FIG. 8, which is a view showing a spectrum of the present invention. As shown in the figure, after forming flat-top passbands through passband flatters and greatly reducing crosstalk through crosstalk reducers, an almost ideal passband window 901 is formed for passbands transferred in the end.

To sum up, the present invention is a Mach-Zehnder WDM having flat passband and low crosstalk, where passbands are flattened, crosstalk is reduced and length is shortened for a Mach-Zehnder WDM to be used in fields of optical communication and optical interconnection.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A Mach-Zehnder wavelength division multiplexer (WDM) having flat passband and low crosstalk, comprising:
   a Mach-Zehnder interferometer (MZI), said MZI comprising:
      a first 3 dB directional coupler;
      a phase-shifting waveguide; and
      a second 3 dB directional coupler;
   at least two side-band eliminators, each said side-band eliminator comprising:
      at least one passband flatter; and
      at least one crosstalk reducer; and
   a winding-type phase-shifting waveguide, said winding-type phase-shifting waveguide comprising:
      a first macro diameter bending waveguide;
      a micro diameter bending waveguide, said micro diameter bending waveguide having a few cycles; and
      a second macro diameter bending waveguide,
   wherein said first 3 dB directional coupler has an input waveguide,
      said input waveguide has an end connected with a phase-shifting waveguide and is parallel to a part of an end of said winding-type phase-shifting waveguide with a fixed space maintained in between, and said first 3 dB directional coupler receives a light obtained from said input waveguide to average an optical power of said light into two,
   wherein ends of both said phase-shifting waveguide and said winding-type phase-shifting waveguide are connected with said first 3 dB directional coupler, said winding-type phase-shifting waveguide is longer than said phase-shifting waveguide, said two averaged lights separately pass through said phase-shifting waveguide and said winding-type phase-shifting waveguide, and said phase-shifting waveguide and said winding-type phase-shifting waveguide have different lengths in between to obtain phase difference,
   wherein said second 3 dB directional coupler has an output waveguide, said output waveguide has an end connected with another two ends of both said phase-shifting waveguide and said winding-type phase shifting waveguide, said end of said output waveguide is parallel to a part of another end of said winding-type phase-shifting waveguide with a fixed space maintained, and said second 3 dB directional coupler receives said two averaged lights having a phase difference obtained from said phase-shifting waveguide and said winding-type phase shifting waveguide to make two averaged lights interfere and be coupled to different outputs to obtain wavelength division multiplexing, wherein each of said side-band eliminators comprises two neighboring waveguides, one of said two neighboring waveguides is cut off at an end, each said side-band eliminator is based on a grating-assisted directional coupler, and each said side-band eliminator has only one input and only one output formed with a cross-state input waveguide and a corresponding cut-off output waveguide, wherein an end of an input waveguide of said passband flatter is parallel to a part of an output waveguide with a fixed space maintained in between to form a coupling area, a grating structure of said passband flatter is obtained on said coupling area of said input waveguide of said passband flatter and said output waveguide, said grating structure of said passband flatter reflects a wavelength as a center wavelength of a passband, said grating structure of said passband flatter has a length of 1~2 dB optical power reflection to form a notch-type Gaussian-like distribution, and a flat-top passband is obtained through interaction with said Gaussian-like distribution of said passband flatter, wherein an end of said output waveguide of said second 3 dB directional coupler is parallel to a part of an end of an output waveguide of said crosstalk reducer with a fixed space maintained in between to obtain a coupling area, a grating structure of said crosstalk reducer is obtained on said coupling area of said output waveguide of said second 3 dB directional coupler and said output waveguide of said crosstalk reducer, said grating structure reflects a wavelength as a center wavelength of an adjacent passband, said grating structure has a length of more than 20 dB of optical power reflection to form a notch-type Gaussian-like distribution, and crosstalk higher than 20 dB is greatly reduced through interaction of said grating structure of said crosstalk reducer with said Gaussian-like distribution of said adjacent passband, and wherein said first macro diameter bending waveguide is connected with said input waveguide of said first 3 dB directional coupler, said second macro diameter bending waveguide is connected with said output waveguide of said second 3 dB directional coupler, and said micro diameter bending waveguide is located between said first macro diameter bending waveguide and said second macro diameter bending waveguide.

2. The WDM according to claim 1,
wherein said grating structure in said passband flatter and said grating structure in said crosstalk reducer are general gratings.

3. The WDM according to claim 1,
wherein devices of said passband flatter, said crosstalk reducer and said winding-type phase-shifting waveguide are configured to be separately operable and also are configured to be operated with a number of said devices selected from the group consisting of one of said devices, two of said devices, and all three of said devices.

* * * * *